(12) United States Patent
Harwell et al.

(10) Patent No.: US 9,733,786 B2
(45) Date of Patent: Aug. 15, 2017

(54) SYSTEM AND METHOD OF CAPTURING AND SHARING MEDIA

(71) Applicant: Twine Labs, LLC, Perrysburg, OH (US)

(72) Inventors: Aaron C. Harwell, Perrysburg, OH (US); Jonathan R. Hawker, Perrysburg, OH (US)

(*) Notice: Subject to any disclaimer, the term of this patent is extended or adjusted under 35 U.S.C. 154(b) by 8 days.

(21) Appl. No.: 14/383,968

(22) PCT Filed: Nov. 20, 2013

(86) PCT No.: PCT/US2013/070891
§ 371 (c)(1),
(2) Date: Sep. 9, 2014

(87) PCT Pub. No.: WO2014/081757
PCT Pub. Date: May 30, 2014

(65) Prior Publication Data
US 2015/0036004 A1 Feb. 5, 2015

Related U.S. Application Data

(60) Provisional application No. 61/728,458, filed on Nov. 20, 2012.

(51) Int. Cl.
*H04N 5/232* (2006.01)
*H04N 5/222* (2006.01)
(Continued)

(52) U.S. Cl.
CPC .......... *G06F 3/0481* (2013.01); *H04L 67/10* (2013.01); *H04L 67/1095* (2013.01);
(Continued)

(58) Field of Classification Search
CPC ........ G03B 15/00; G03B 17/53; G03B 15/06; G03B 17/00; H04N 1/00132;
(Continued)

(56) References Cited

U.S. PATENT DOCUMENTS 5,446,515 A 8/1995 Wolfe et al.
6,771,801 B1* 8/2004 Fisher ................ H04N 1/00164
283/67

(Continued)

OTHER PUBLICATIONS

Destazio, J. et al., "iPartyBooth iPhone Application," Functional Specification, Sep. 18, 2011, pp. 1-14.

*Primary Examiner* — Chia-Wei A Chen
(74) *Attorney, Agent, or Firm* — Shumaker, Loop & Kendrick, LLP; Michael E. Dockins

(57) ABSTRACT

A system of capturing and sharing media including a plurality of communication devices and a management server in communication with the communication devices and including a processor and a downloadable user interface configured to distribute to the communication devices a media captured during a defined event, the media distributable to each communication device associated with the defined event. The system further include a database in communication with the management server configured to store data related to a plurality of registered user accounts.

15 Claims, 9 Drawing Sheets

(51) Int. Cl.
*G06F 3/0481* (2013.01)
*H04L 29/08* (2006.01)
*H04M 1/725* (2006.01)

(52) U.S. Cl.
CPC ............ *H04L 67/26* (2013.01); *H04L 67/306* (2013.01); *H04M 1/72566* (2013.01); *H04N 5/222* (2013.01); *H04N 5/23222* (2013.01); *H04M 2250/52* (2013.01)

(58) Field of Classification Search
CPC ........... H04N 1/00188; H04N 1/00196; H04N 1/00289; H04N 1/00183; H04N 21/2542; H04N 21/2543; H04N 21/47815; H04N 5/222; H04N 5/23222; G06F 3/0481; H04L 67/10; H04L 67/1095; H04L 67/26; H04L 67/306
USPC ......... 348/61, 211.1–211.99, 333.01–333.13; 396/1–5
See application file for complete search history.

(56) References Cited

U.S. PATENT DOCUMENTS

| | | | |
|---|---|---|---|
| 7,415,204 B1* | 8/2008 | Rosewarne | G03B 15/00 345/634 |
| 2005/0060542 A1 | 3/2005 | Risan et al. | |
| 2006/0235718 A1* | 10/2006 | Yoda | G06Q 99/00 358/1.1 |
| 2007/0236558 A1 | 10/2007 | Ryckman et al. | |
| 2008/0103975 A1* | 5/2008 | Taratino | G06Q 30/06 705/57 |
| 2008/0106613 A1* | 5/2008 | van Schalkwyk | H04N 1/00132 348/231.2 |
| 2008/0310829 A1* | 12/2008 | Bakewell | G03B 15/00 396/2 |
| 2009/0044235 A1* | 2/2009 | Davidson | G06Q 30/06 725/87 |
| 2009/0055759 A1 | 2/2009 | Svendsen | |
| 2010/0262828 A1* | 10/2010 | Brown | H04L 9/0844 713/171 |
| 2010/0262829 A1* | 10/2010 | Brown | H04L 63/061 713/171 |
| 2010/0296801 A1* | 11/2010 | Lane | G03B 17/53 396/2 |
| 2011/0008036 A1* | 1/2011 | Takatsuka | G03B 15/00 396/283 |
| 2011/0069179 A1* | 3/2011 | Bathiche | H04N 5/23206 348/207.1 |
| 2011/0234779 A1 | 9/2011 | Weisberg | |
| 2012/0012651 A1 | 1/2012 | Kenna, III et al. | |
| 2012/0041814 A1* | 2/2012 | Kraft | G06Q 30/0207 705/14.36 |
| 2012/0087643 A1* | 4/2012 | Paramadilok | E04H 1/125 396/2 |
| 2012/0120257 A1* | 5/2012 | Corn | H04N 1/00132 348/207.1 |
| 2012/0136698 A1* | 5/2012 | Kent | G06Q 20/3276 705/14.1 |
| 2012/0226663 A1* | 9/2012 | Valdez Kline | G06F 17/30091 707/640 |
| 2012/0324002 A1* | 12/2012 | Chen | G06F 17/30274 709/204 |
| 2013/0014139 A1* | 1/2013 | Kawakami | A63J 5/021 725/9 |
| 2013/0018960 A1* | 1/2013 | Knysz | H04L 65/403 709/204 |
| 2013/0070093 A1* | 3/2013 | Rivera | G11B 27/002 348/143 |
| 2013/0117153 A1* | 5/2013 | Shen | G06Q 30/0241 705/26.9 |
| 2013/0117365 A1* | 5/2013 | Padmanabhan | H04W 4/206 709/204 |
| 2013/0124508 A1* | 5/2013 | Paris | G06F 17/3028 707/723 |
| 2013/0160141 A1* | 6/2013 | Tseng | G06F 21/6245 726/28 |
| 2013/0286223 A1* | 10/2013 | Latta | H04N 1/00347 348/207.1 |
| 2013/0307997 A1* | 11/2013 | O'Keefe | H04L 51/10 348/207.1 |
| 2013/0307998 A1* | 11/2013 | Tautenhahn | H04N 1/00289 348/207.1 |
| 2014/0114738 A1* | 4/2014 | Tseng | G06Q 30/0241 705/14.27 |
| 2014/0350855 A1* | 11/2014 | Vishnuvajhala | G06Q 50/10 701/538 |
| 2015/0221219 A1* | 8/2015 | Engelbert | G07B 15/02 340/932.2 |
| 2016/0029102 A1* | 1/2016 | Daily | H04N 21/812 725/93 |

\* cited by examiner

To Fig. 12B

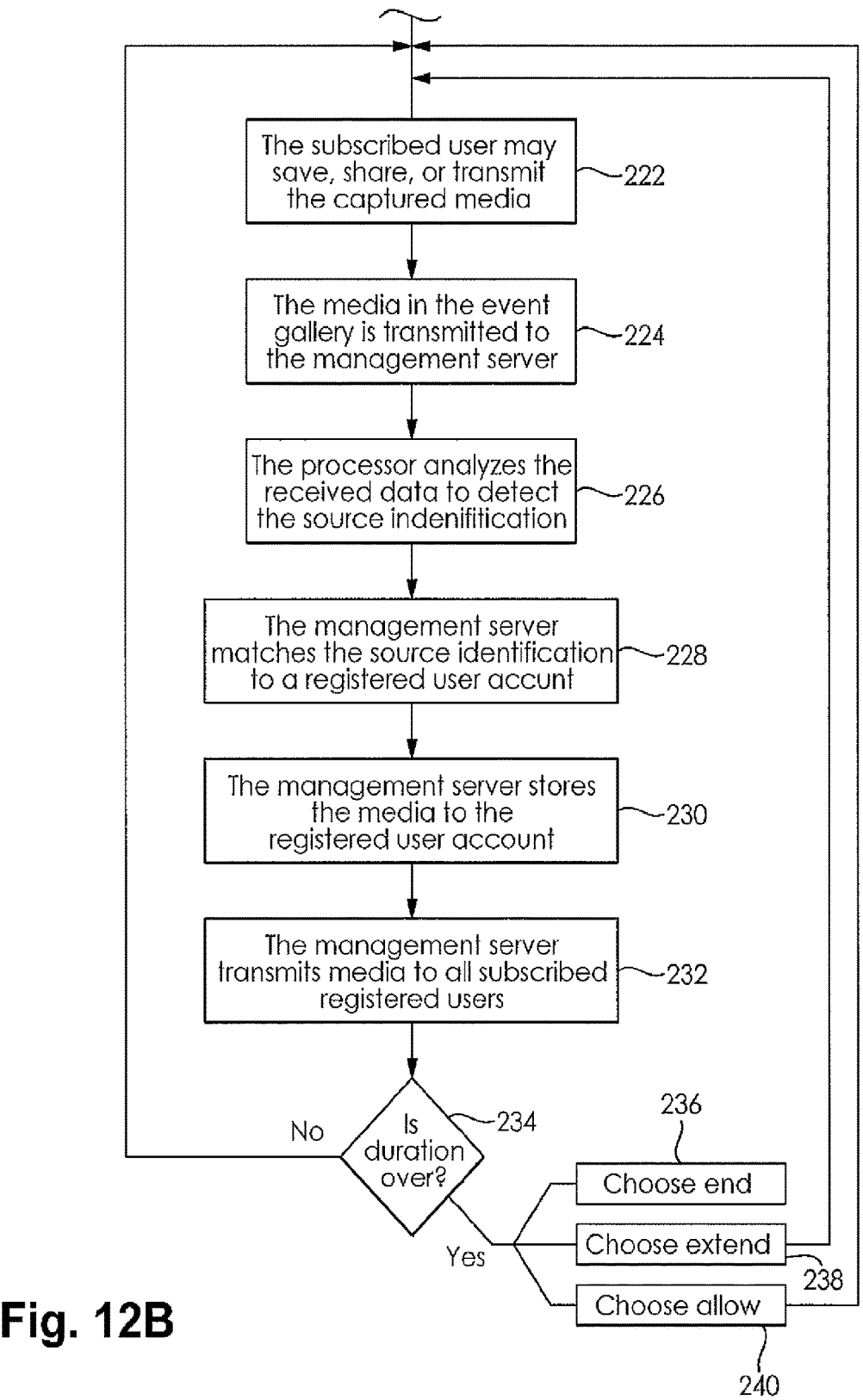

SYSTEM AND METHOD OF CAPTURING AND SHARING MEDIA

CROSS-REFERENCE TO RELATED APPLICATION

This application claims the benefit of priority of International PCT Pat. App. Ser. No. PCT/US13/70891 filed on Nov. 20, 2013 which claims the benefit of priority of U.S. Provisional Patent Application Ser. No. 61/728,458 filed on Nov. 20, 2012 each of which is hereby incorporated herein by reference in their entireties.

FIELD OF THE INVENTION

The present invention relates to a system and method of capturing and sharing media, and more particularly to a system and method of capturing and sharing media including a network for multiple users to conveniently capture and share media.

BACKGROUND OF THE INVENTION

As technology advances, electronic devices continue to become smaller and include more features. Currently, electronic devices such as cell phones, portable computers, and application-enabled cameras (i.e. as iPAD® tablet application-enabled camera manufactured by Apple, Inc. of Cupertino, Calif., ANDROID™ mobile device application-enabled camera by Google, Inc. of Mountain View, Calif., etc.) for example, often include phone, email, and media capturing and playing capabilities. Typically, digital cameras that are integrated into the electronic devices produce digital images having a quality that is sufficiently high to allow the electronic device to be used as a primary camera.

One drawback with camera-integrated electronic devices is the relative complexity in sharing stored images between multiple devices and people. For example, some electronic devices are connected to a printer to create hard-copy prints. The user can then manually insert the images into an album. Users often find this process complicated and restrictive because standard printers can only print images in limited sizes. Additionally, standard printers require particular types of paper and ink. To acquire the paper or ink can become inconvenient and expensive. Even after the album has been assembled, the printed images are not easily shared. For example, unless the images are shared, multiple people attending an event together may only view the images of the event that are on their own devices.

There are various approaches to sharing the images using the Internet. One such approach for sharing the images is for users to store the images on a PC and then send the images to others using email. However, email size is usually limited by a host of an email account. Consequently, if a user wants to share numerous images, multiple emails may be required. Another approach is for users to upload and post the images on a social networking website. However, the images may be viewable by others who were not intended to see the images. Both approaches are cumbersome and time-consuming.

It would be desirable to develop a system and method for capturing and sharing media, wherein the system and method provide a network for multiple users to conveniently capture and share media for a jointly-attended event.

SUMMARY OF THE INVENTION

In concordance and agreement with the present invention, a system and method for capturing and sharing media, wherein the system and method provide a network for multiple users to conveniently capture and share media for a jointly-attended event, has surprisingly been discovered.

In one embodiment, a system of capturing and sharing media, is disclosed. The system includes a plurality of communication devices; a management server in communication with the communication devices and including a processor and a downloadable user interface configured to distribute to the communication devices a media captured during a defined event, the media distributable to each communication device associated with the defined event; and a database in communication with the management server configured to data related to a plurality of registered user accounts.

In another embodiment, a system of capturing and sharing media is disclosed. The system includes a plurality of communication devices; an apparatus configured for use in a photography booth, at least one of the communication devices coupled to the apparatus; a management server in communication with the communication devices and including a processor and a downloadable user interface configured to distribute to the communication devices a media captured during a defined event, the media distributable to each communication device associated with the defined event; and a database in communication with the management server configured to store data related to a plurality of registered user accounts.

In yet another embodiment of the invention, a method of capturing and sharing media includes providing a plurality of communication devices, wherein at least one of the communication devices is configured to capture media; providing a management server including a downloadable user interface in communication with the communication devices; creating a defined event using the downloadable user interface; capturing media at the defined event using at least one of the communication devices; and distributing the captured media to at least another one of the communication devices using the user interface.

DESCRIPTION OF THE DRAWINGS

The above, as well as other advantages of the present invention, will become readily apparent to those skilled in the art from the following detailed description, when considered in the light of the accompanying drawings:

FIG. 12A-12B is a schematic flow diagram of a method of capturing and sharing media which occurs within the system of FIG. 1 according to an embodiment of the invention.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
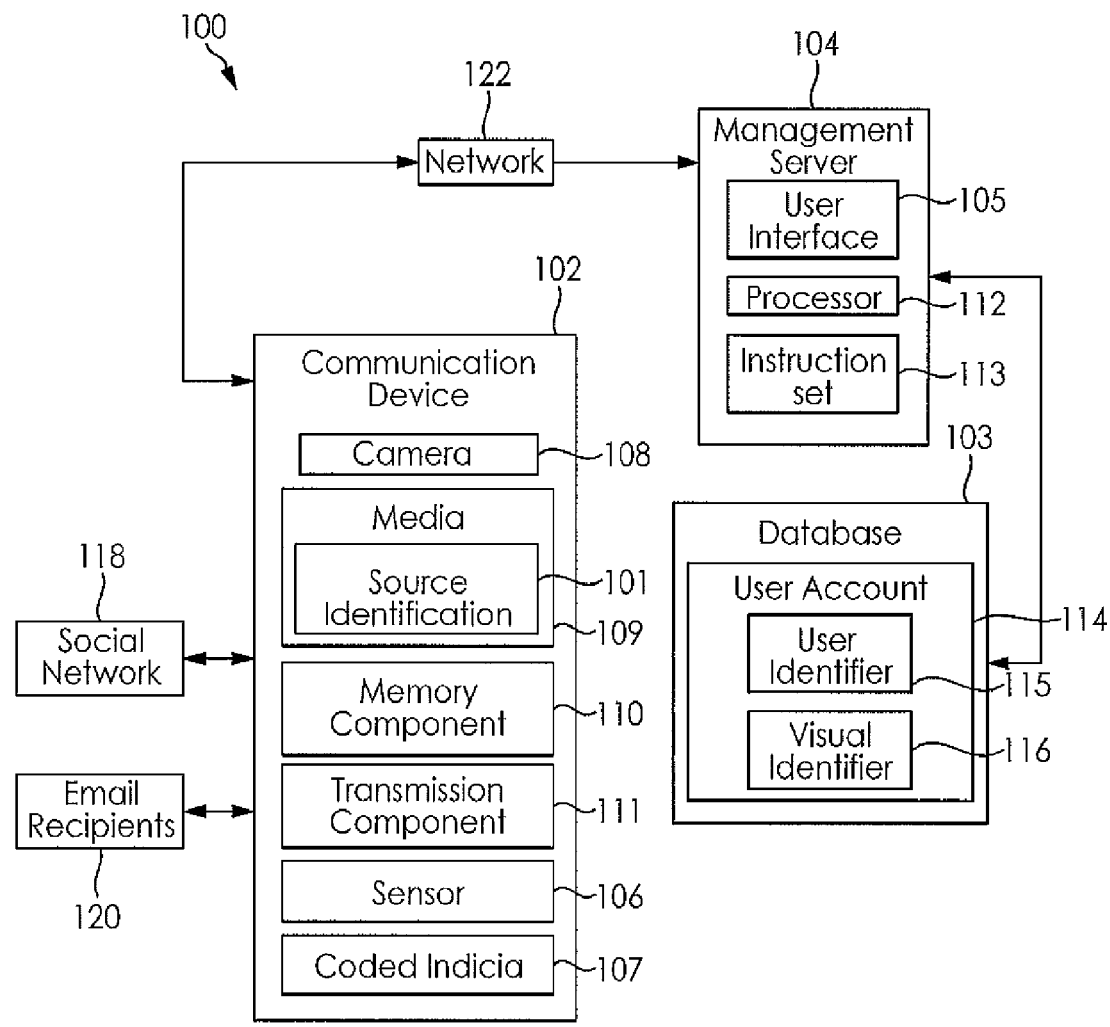
FIG. 1 is a schematic flow diagram of a system for capturing and sharing media according to an embodiment of the present invention.

FIG. 1 shows a system 100 for capturing and sharing media according to the present invention. The system 100 shown includes one or more communication devices 102, a database 103, and a management server 104 including a user interface 105. In certain embodiments, the user interface 105 is a downloadable web application which is described in further detail hereinafter. The communication device 102 can be a smartphone, such as an iPhone® smartphone, a laptop, a desktop, a tablet, such as an iPad® tablet, and an application-enabled camera. However, those skilled in the art would appreciate that the invention can be practiced with other devices and configurations suitable for capturing, sending, and receiving media, including Internet appliances, hand-held devices, wearable computers, multi-processor systems, microprocessor-based or programmable consumer electronics, set-top boxes, PDAs, and other similar devices and configurations as desired. The term "communication device" is intended to include all such devices. It is understood that any number of communication devices, databases, and servers may be included, as well as any other components necessary for operation of the system 100.

In the embodiment shown in FIG. 1, the communication device 102 includes a sensor 106 for reading data from a coded indicia 107. The coded indicia 107 can be an access code, a UPC code, a barcode, such as a quick response code commonly known as a QR code, for example. The communication device 102 can further include a camera 108 for capturing media 109 such as a digital image or video. The media 109 can include a source identification 101 identifying the source of the media 109. The communication device 102 also includes a memory component 110 and a transmission component 111. The memory component 110 is configured for storing the captured media 109 and the coded indicia 107. The transmission component 111 is configured for sending and receiving the media 109 and the coded indicia 107.

The management server 104 is configured to intercommunicate with the communication devices 102, send and receive the media 109 and the data therebetween, and manage the transmission, storage, identification, and customization of the media 109 and the data. In certain embodiments, the management server 104 includes a processor 112 configured to control functions of the management server 104 based upon an instruction set 113. The instruction set 113, which may be embodied within any computer readable medium, includes processor executable instructions for configuring the processor 112 to perform a variety of tasks. As a non-limiting example, the instruction set 113 may be computer coded instructions for a web application. As a further non-limiting example, the instruction set 113 may be stored in the database 103.

The management server 104 is in communication with the database 103 using any suitable language for server-database compatibility. In the embodiment shown, the database 103 is configured to store data and information related to a plurality of registered user accounts 114. Each of the user accounts 114 may include at least one user identifier 115 associated with a particular user to identify the particular user, such as a username, a password, a cell phone number, and/or an email address, for example. It is understood that the data and information can be associated with any of the user accounts 114. Those skilled in the art would appreciate that the user accounts 114 can be an individual, group, or corporate accounts. Each of the user accounts 114 may also include at least one visual identifier 116 associated with a particular user to identify the particular user such as a profile image, a company or brand logo, and/or a watermark, for example. The visual identifier 116 is associated with at least one of the user accounts 114 and viewable by other users through the user interface 105. It is understood that the visual identifier 116 can be customized and personalized by the user, as desired.

The various components of the system 100 communicate via one or more networks 122. For example, the system 100 may include a wireless telecommunication network. Examples of wireless telecommunication networks include UMTS (universal mobile telecommunication system), GSM (global system for mobile communications), which can include GPRS (general packet radio service), EDGE (enhanced data rates for GSM evolution), CDMA (code division multiple access), IS-136, analog, or any other wireless networks, as desired. The system 100 may also include various wired or partially wired networks, such as the Internet, a wired LAN (local area network), or even a public switched telephone network (PSTN). While not all types of networks are described herein, the invention may be implemented within the framework of many types of networks. In certain embodiments, the user interface 105 is configured to communicate within more than one of the above described communication networks. For example, the user interface 105 may be accessed via a personal computer or laptop using a wired or partially wired public communication network, such as the Internet. The user interface 105 can also be accessed via a telecommunication network, such as one of the wireless or wired networks described above. However, it is understood that other protocols and data transfer services can be used.

FIGS. 2-11 show various screens or web pages of the user interface 105 to illustrate an underlying functionality thereof. The screens or web pages provide facilities to receive input data, such as a form with fields to be filled in, pull-down menus or entries allowing one or more of several options to be selected, buttons, sliders, hypertext links or other known user interface tools for receiving user input. While certain ways of displaying information to users is shown and described, those skilled in the relevant art will recognize that various other alternatives may be employed. The screens or web pages are stored and/or transmitted as display descriptions, as graphical user interfaces, or by other methods of depicting information on a screen (whether personal computer, PDA, mobile telephone or other) where the layout and information or content to be displayed on the page is stored in a memory, a database, or other storage facility.

When implemented as web pages or wireless content, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or a node on the network 122. A "display description," as generally used herein, refers to any method of automatically displaying information on a communication device 102 in any of the above-noted formats, as well as other formats, such as email or character/code-based formats, algorithm-based formats (e.g., vector generated), or matrix or bitmapped formats. While aspects of the invention are described herein using a networked environment, some or all features may be implemented within a single-computer environment. Those skilled in the art would also appreciate that the graphics and layout of the screens or web pages are for illustration purposes only and an actual display of the user interface 105 may change and develop overtime.

Figure 2:
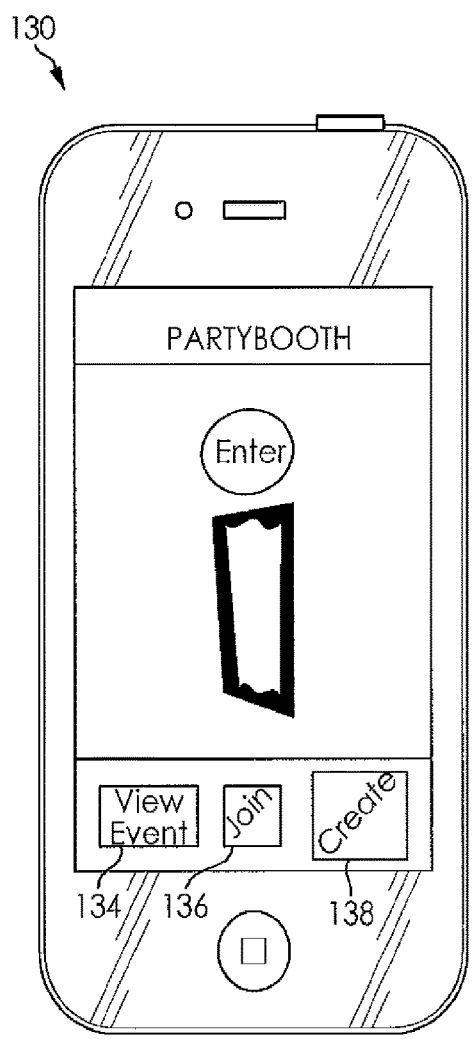
FIGS. 2-11 are graphical representations which show various screens or web pages of a user interface of the system of FIG. 1 to illustrate an underlying functionality thereof.
Figure 3:
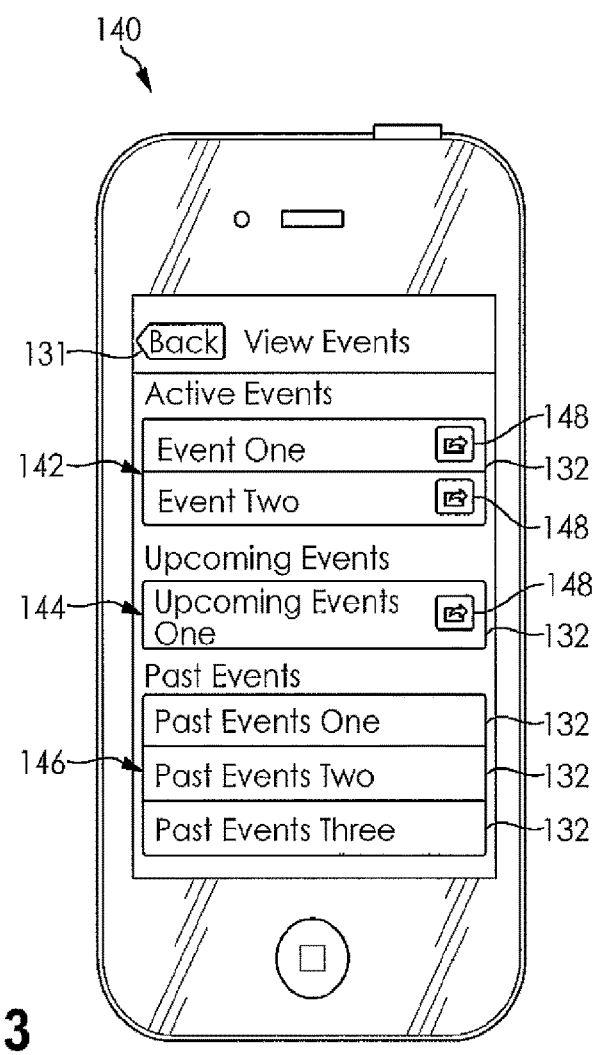

The user interface 105 of the present invention includes a main screen 130, as shown in FIG. 2, that appears when the user interface 105 is launched. From the main screen 130, the user can select to view, join, or create an event 132 via associated action controls 134, 136, 138. When the view event action control 134 on the main screen 130 is selected by the user, a list of events screen 140, as shown in FIG. 3, appears on the communication device 102. The list of events screen 140 lists all of the events 132 that the user has subscribed. In certain embodiments, the events 132 are displayed in groups: an active events group 142, an upcoming events group 144, and a past events group 146. Each of the groups 142, 144, 146 may be listed chronologically starting with the most recent event at the top. It is understood, however, that the events 132 can be displayed in any manner as desired such as alphabetically, numerically, or by type, for example. Each of the events 132 of the active events group 142 can include the event name, time remaining, and number of media currently in an event gallery 151. Each of the events 132 of the upcoming events group 144 can include the event name and date of the event. Each of the events 132 of the past events group 146 can include the event date and the number of media in the gallery.

Figures 4, 5:
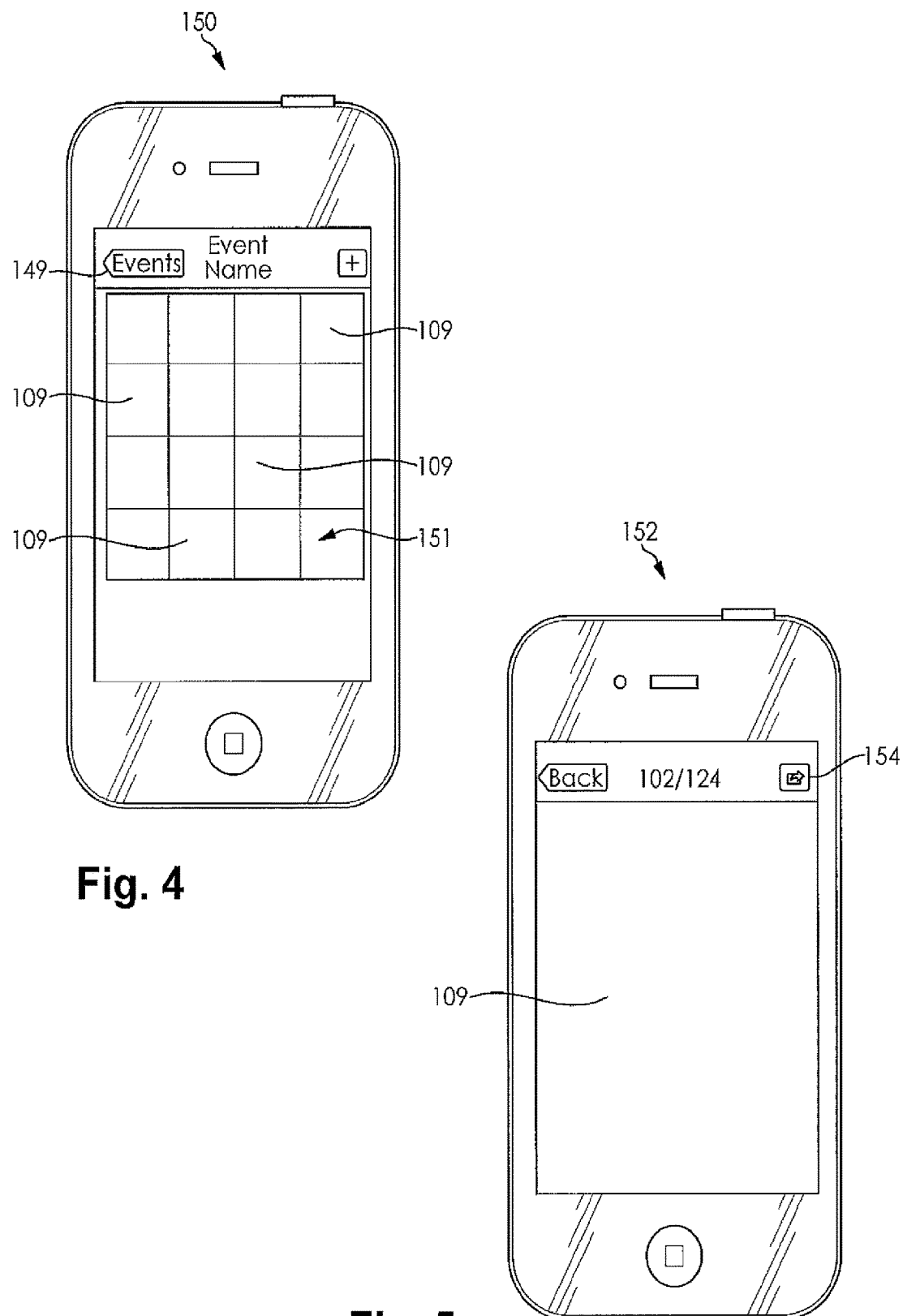
Figure 6:
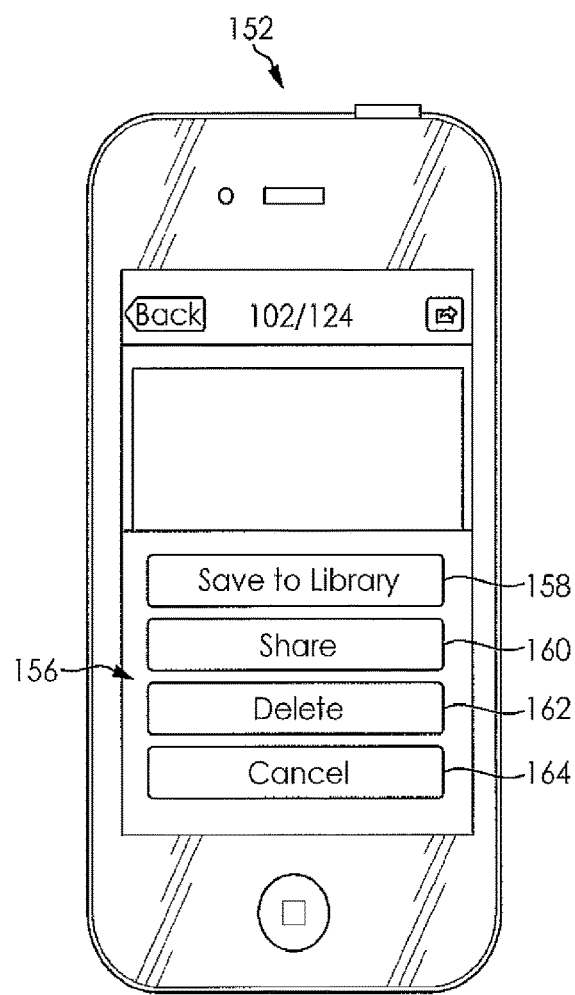

An action control 148 is included on each of the events 132 of the active events group 142 and the upcoming events group 144 that, when selected, launches an action sheet (not shown) with options for sharing the coded indicia 107 for the respective event. The coded indicia 107 can be an access code, a UPC code, or a barcode, such as a quick response code commonly known as a QR code, for example. As a non-limiting example, the action control 148 is only available to the user who created the event 132. However, the action control 148 can be configured to be available to other users, if desired. From the list of events screen 140, the user can either return to the main screen 130 by selecting an actuating control 131, or select one of the events 132 listed which launches a view event screen 150, as shown in FIG. 4.

The view event screen 150 shows at least a portion of the media 109 in a particular event gallery 151. In the embodiment shown, the media 109 are shown as thumbnails in a grid view, similar to an iOS Camera Roll grid view created by Apple, Inc. of Cupertino, Calif. Other data and information such as a count of the media 109 and a date of the event 132 can be displayed on the view event screen 150 as desired. From the view event screen 150, the user can return to the list of events screen 140 by selecting an actuating control 149 or select one of the media 109 displayed which launches a view media screen 152, as shown in FIG. 5. The view media screen 152 shows media 109 in the event gallery 151 of the event 132. An action control 154 is included on the view media screen 152 that, when selected, launches an action sheet 156 shown in FIG. 6 with respective controls 158, 160, 162, 164 for saving the media 109 to a library of the communication device 102, sharing the media 109 by launching a save/share screen 166, shown in FIG. 7, deleting the media 109, and cancelling out of the action sheet 156. As a non-limiting example, the media 109 can only be deleted by the user who is an administrator or the user that initially shared the media 109 to the event gallery 151. Once the media 109 is deleted, the user is returned to the view event screen 150.

Figure 7:
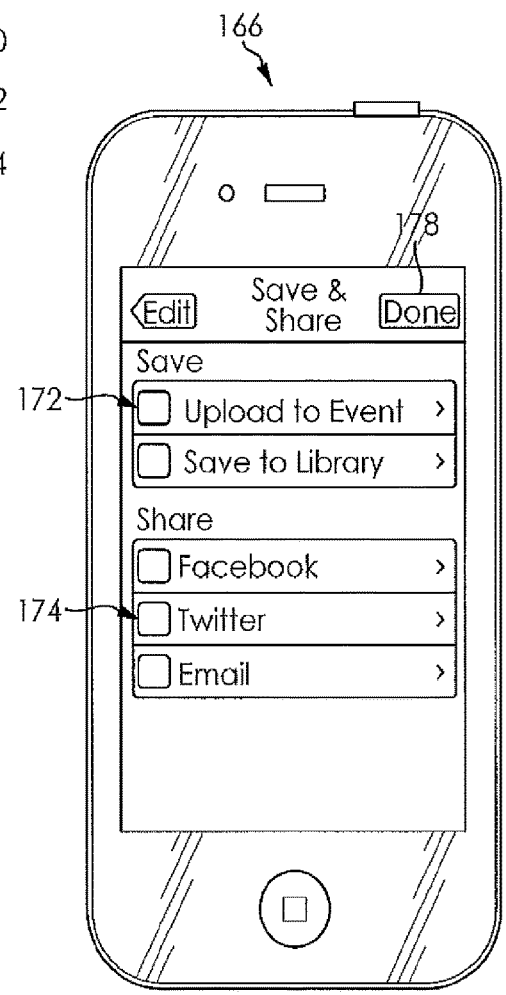
Figure 8:
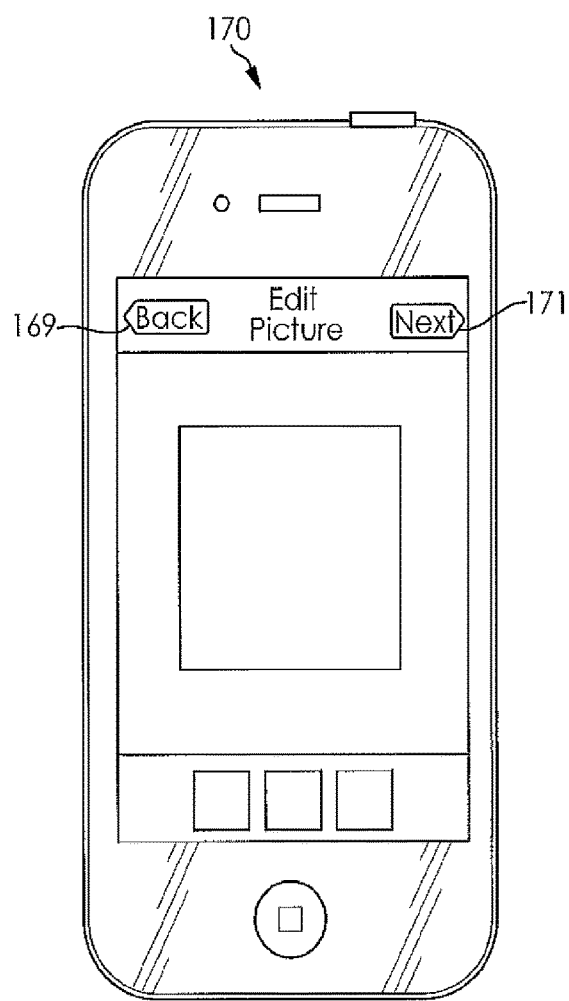

From the view media screen 152, the user can also be directed to an edit media screen 170, shown in FIG. 8, by selecting the share the media control 160. The edit media screen 170 permits the user to modify the media 109 such as applying an effect which changes an overall appearance of the media 109. An a non-limiting example, the edit media screen 170 permits the user to modify the media 109 by changing to black and white, adding a sepia tone, or reverting to an original coloring. From the edit media screen 170, the user can return to the view media screen 152 by an actuating control 169 or proceed to the save/share screen 166 by actuating control 171. The save/share screen 166, shown in FIG. 7, provides the user with save options 172 and share options 174. In certain embodiments, the save options 172 include, but are not limited to: uploading the edited media 109 to the event gallery 151 of the event 132 and saving the edited media 109 to a library stored in the memory component 110 of the communication device 102. The save option 172 of uploading the edited media 109 to the event gallery 151 is only available if there are active events 142. If there is one active event 142, the one active event 142 will be selected by default. However, if there is more than one active event 142, the user must select to which event gallery 151 the media 109 is to be uploaded. In the embodiment shown, the sharing options 174 include: selecting a social network 118 such as Facebook® social network or Twitter® social network or other means such as an e-mail 118 to which to share the media 109. However, it is understood other share options can be available such as Instagram™ social network, Flickr™ social network, iCLOUD™ social network, text messaging, etc. The save/share screen 166 further includes an action control 178 that, when selected, launches the main screen 130.

Figure 9:
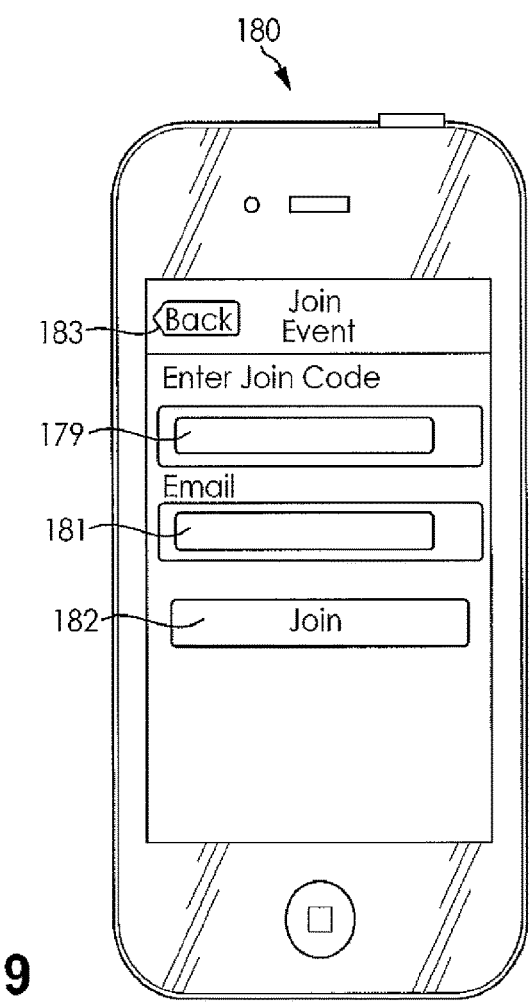

When the join event action control 136 on the main screen 130 is selected by the user, a join event screen 180, shown in FIG. 9, appears on the communication device 102. The join event screen 180 permits users who have the coded indicia 107 to upload media 109 to the event gallery 151 of the particular event 132. In certain embodiments, the user inputs required information such as the coded indicia 107 into a code entry box 179 and an email address into a user identification entry box 181 on the join event screen 180 in order to join the particular event 132. The email address can be saved to the database 104 so that the user will not need to re-input the email address for future events 142. It is understood that additional information may be required in order for the user to join the particular event 132, if desired. If a valid coded indicia 107 is entered into the join event screen 180, an action control 182 can be selected. When the action control 182 is selected, the view event screen 150 as described hereinabove appears.

Figure 10:
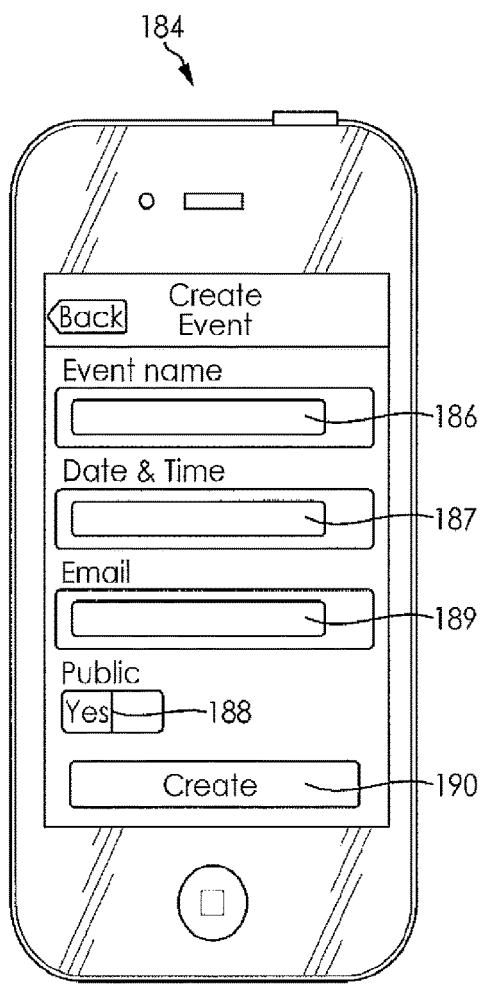
Figure 11:
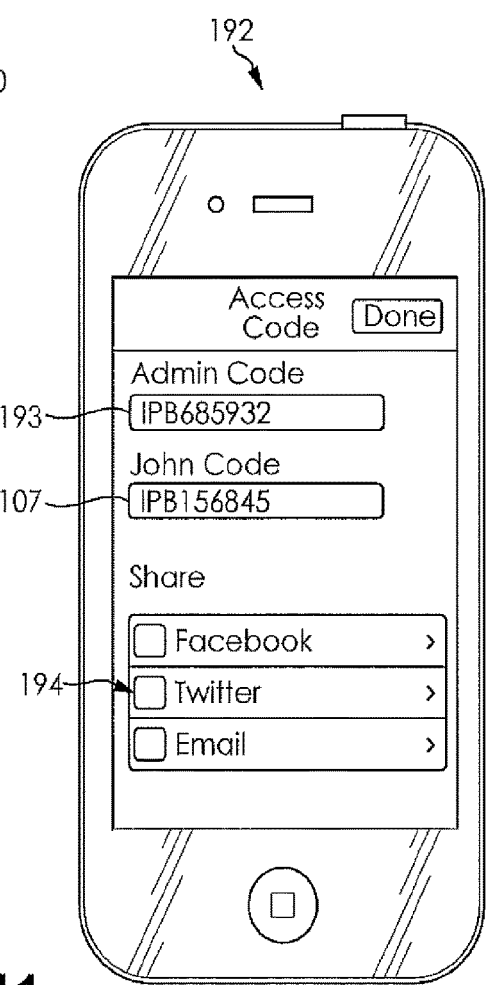

When the create event action control 138 on the main screen 130 is selected by the user, a create event screen 184, shown in FIG. 10, appears on the communication device 102. The create event screen 184 permits the user to input information required to create an event 132. In the embodiment shown, the user inputs required information such as a name of the event 132 into an event entry box 186, a date and time of the event 132 into a date and time entry box 187. The user can also indicate whether the event gallery 151 of the event 132 is to be public so other users can view the event gallery 151 or private so other users cannot see the event gallery 151, through a selection control 188. An email address of the user may also be required in a user identification entry box 189 in order to create the other event 132. The email address can be saved to the database 104 so that the user will not need to re-input the email address for future events 132. It is understood that additional information may be required in order for the user to create the particular event 132 such as a password of the user and a duration period of the particular event 132. In certain embodiments, the user selects either an 8-hour duration period or a 24-hour duration period of the particular event 132. Those skilled in the art will appreciate that the duration period can be any length of time specified. During the duration period, the media 109 can be uploaded and saved to the event gallery 151 of the particular event 132. Once the duration period expires, additional media 109 can no longer be uploaded and saved to the event gallery 151 of the particular event 132. It is understood, however, that the duration period may be extendable for a defined length of time (e.g. 30 minutes, 1 hour, 8 hours) or for any length of time to permit the media 109 to be uploaded and saved to the event gallery 151 of the particular event 132. It is also understood that the media 109 may be permitted to be uploaded and saved to the event gallery 151 of the particular event 132 even after the duration period has expired.

In certain embodiments, payment can also be required to create an event 132. Where payment is required, complete details of purchase conditions and requirements can be displayed on the create event screen 184. An action control 190 is included on the create event screen 184 that, when selected, together with successful payment, a create event receipt screen 192, shown in FIG. 11, appears. Those skilled in the art will appreciate that any form of payment is acceptable such as by entering a credit card number or checking account number, for example. As a non-limiting example, the user may purchase or earn credits which are then used as payment when creating the event 132. In certain embodiments, the user earns credits by creating and joining events 132 and sharing the media 109 such as through social networks (i.e. Facebook® or Twitter®) or other means (i.e. email).

The create event receipt screen 192 displays an administrator code 193 and the coded indicia 107 of the particular event 132. The coded indicia 107 is provided to any user who desires to upload and save media 109 to the event gallery 151 of the particular event 132. The administrator code 194 is provided to any user who needs ability to administer the event gallery 151 of the particular event 132 such as deleting uploaded and saved media 109. The create event receipt screen 192 may include sharing options 194. In certain embodiments, the sharing options 194 include, but are not limited to: selecting the social network (i.e. Facebook® or Twitter®) or other means (i.e. email) to which to share the coded indicia 107 with other users. However, other share options can be available such as Instagram™ social network, Flickr™ social network, iCLOUD™ social network, text messaging, etc. The create event receipt screen 192 may also include an action control (not shown) that, when selected, the view event screen 150 as described hereinabove appears.

Figure 12A:
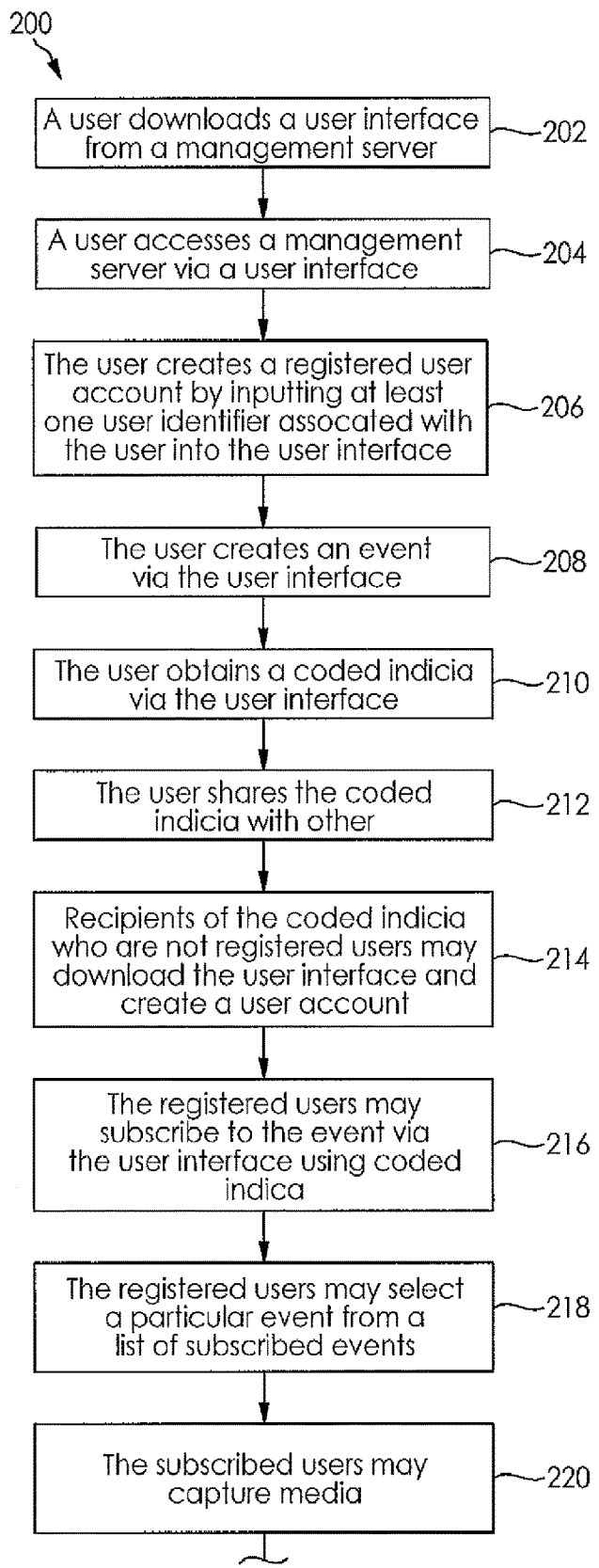

FIG. 12A-12B is a representative flow diagram that shows the method 200 of capturing and sharing media which occurs within the system of FIG. 1 according to an embodiment of the invention. The flow diagrams do not show all functions or exchanges of data, information, and media but, instead, provide an understanding of commands and data, information, and media exchanged under the system 100. Those skilled in the art appreciate that some functions or exchanges may be repeated, varied, omitted, or supplemented, and other aspects not shown may be readily implemented.

The method 200 includes step 202 in which a user downloads the user interface 105 (i.e. web application) from the management server 104. In step 204, the user, as an administrator, accesses the user interface 105 via a communication device 102. In step 206, the user may create one of the registered user accounts 114 by inputting at least one user identifier 115 associated with the user into the user interface 105. Optionally, the user may also upload at least one visual identifier 116 associated with the user into the user interface 105. For example, the user may upload a corporate logo and a watermark. Once the user has established one of the registered user accounts 114, the user creates an event 132 via the interface 105 for a certain date, at a specific time, and for a desired duration, according to step 208. The user may also define other parameters such as a color scheme which may be incorporated into each of the screens of the user interface 105 or initiate other features of the user interface 105 such as a feature which adds the corporate logo and/or watermark to any media 109 captured and shared from the event 132.

Once the event 132 is created, in step 210, the user obtains a coded indicia 107, such as an access code, a UPC code or a barcode, such as a quick response code commonly known as a QR code, for example, via the user interface 105. In step 212, the user shares the coded indicia 107 with others via any electronic or non-electronic means as desired. For example, the coded indicia 107 for corporate or large activities may be presented on promotional resources such as signage, pamphlets, Facebook® social network, Twitter® social network, etc. In step 214, recipients of the coded indicia 107, who are not registered users of the system 100, download the user interface 105 via the network 122 and create the user account 114. Thereafter, in step 216, any of the registered users may subscribe to the event 132 via the user interface 105 using the coded indicia 107. In step 218, the registered users select a particular event 132 from the list of subscribed events 132. Once the particular event 132 is selected, in step 220, any of the subscribed registered users may capture media 109 at the particular event 132. In step 222, the subscribed registered user may then edit, save, and share the media 109 via the user interface 105. In certain embodiments, the media 109, edited or unedited, can be uploaded to the event gallery 151 of the particular event 132, saved to the library of the communication device 102, shared to the social network (i.e. Facebook® or Twitter®), and/or shared to desired recipients via other means (i.e. email).

When the captured media 109 is uploaded to the event gallery 151 of the particular event 132, the media 109 is transmitted to the management server 104 in step 224. The media 109 transmitted contains the source identification 101 associated with the user who captured and shared the media 109. As a non-limiting example, the source identification 101 can be the phone number associated with the communication device 102 used to transmit the media 109. As a further non-limiting example, the source identification 101 can be the email address of the user transmitting the media 109. It is understood that any information can be used as the source identification 101 to identify the media 109 such as any combination of letters, numbers, or characters. It is further understood that the source identification 101 can be similar to at least one of the user identifiers 115 associated with at least one of the registered user accounts 114. In step 226, the media 109 is received by the management server 104 and the processor 112 analyzes the received data to detect the source identification 101. Once the source identification 101 for the media 109 is determined, the management server 104 matches the source identification 101 to an associated one of the registered user accounts 114 on the database 103, according to step 228. In step 230, once a match is determined, the management server 104 stores the media 109 to the associated one of the registered user accounts 114. The management server 104 then transmits the media 109 with the source identification 101 to the communication devices 102 of all of the registered users who have subscribed to the particular event 132 through the user interface 105, in step 232. In step 234, the management server 104 determines whether the duration period of the particular event 132 has expired. In step 236, the captured media 109 can no longer be uploaded to the event gallery 151 of the particular event 132. In other embodiments of the method 200, such as step 238, the duration period of the particular event 132 can be extended to permit the captured media 109 to be uploaded to the event gallery 151 of the particular event 132. In yet other embodiments of the method 200, such as step 240, the captured media 109 can be uploaded to the event gallery 151 of the particular event 132 even after the duration period has expired.

Figure 13:
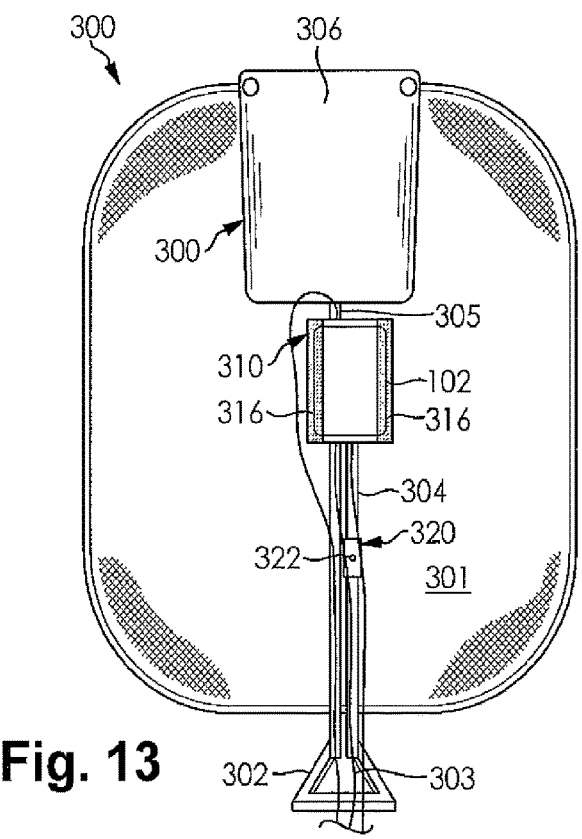
FIGS. 13-14 show an apparatus for use with a backdrop in a photography booth, incorporating a communication device of the system of FIG. 1 according to an embodiment of the invention.
Figure 14:
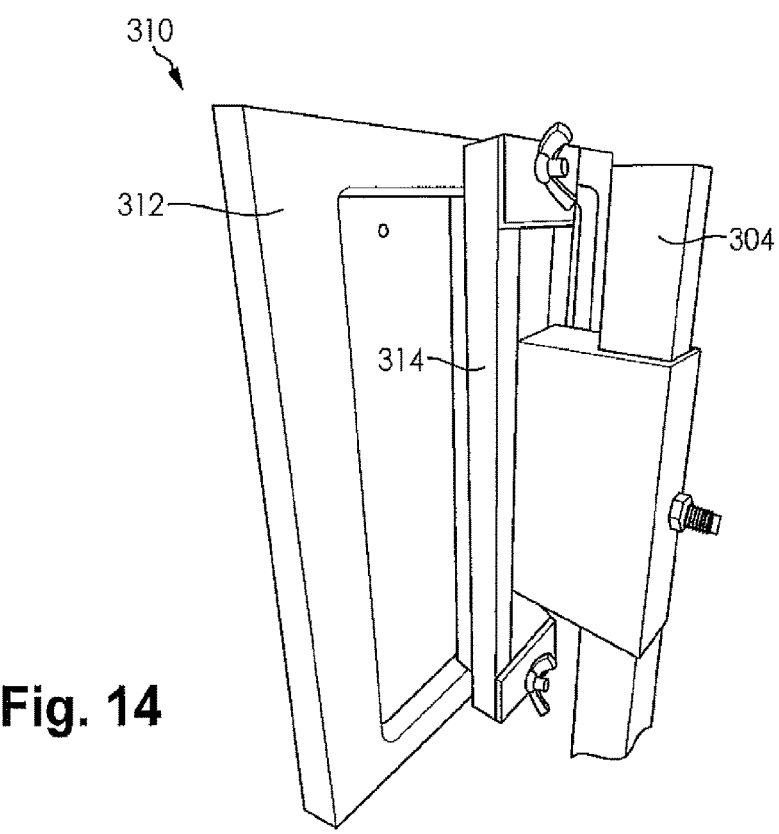

FIGS. 13-14 show the communication device 102 of the system 100 incorporated into an apparatus 300 for use with a backdrop 301 in a photography booth. The apparatus 300 includes a base 302 coupled to a first end 303 of an elongate member 304 extending laterally upwardly therefrom. The base 302 and the elongate member 304 can be separate components or can be formed as a unitary structure if desired. The base 302 and elongate member 304 can be formed from any suitable material or combination of materials such as steel, stainless steel, aluminum, etc. as desired. While the base 302 shown has a generally trapezoidal shape, it is understood that the base 302 can have any shape as desired to maintain a position of the elongate member 304 such as rectangular, hexagonal, octagonal, square, pentagonal, and the like, for example.

As shown, the elongate member 304 supports a light source 306 and the communication device 102. It is understood that the light source 306 can be any light source as desired which is suitable for use in the photography booth. The light source 306 is movably coupled to a second end 305 of the elongate member 304 to permit pivotal and rotational movement of the light source 306 in respect of the elongate member 304. A position of the light source 306 can be secured and maintained by actuating at least one locking mechanism (not shown).

As more clearly illustrated in FIG. 14, the communication device 102 is coupled to the elongate member 304 by a frame assembly 310. Various other means of attachment can be employed to couple the communication device 102 to the elongate member 304. In certain embodiments, the frame assembly 310 includes a frame member 312 configured to hold the communication device 102 and at least one positioning member 314 configured to facilitate a rotational, a pivotal, an axial, and/or a lateral movement of the communication device 102 in respect of the elongate member 304. As such, the positioning member 314 permits the communication device 102 to be manipulated to a desired position when capturing the media 109. The frame member 312 has a generally rectangular shape. However, it is understood that the frame member 312 can have any shape and size to secure the communication device 102 therein such as triangular, circular, hexagonal, pentagonal, or any other shape as desired. Those skilled in the art would also appreciate that other positioning members can be employed to permit the desired movement and positioning of the communication device 102. As shown in FIG. 13, the frame member 312 may further include other features such as side panels 316 which militate against an undesired removal of the communication device 102 from the frame assembly 310.

The apparatus 300 also includes a trigger mechanism 320 for actuating the camera 108 of the communication device 102. As shown in FIG. 13, the trigger mechanism 320 includes a control 322 to permit the user to actuate the camera 108 of the communication device 102 at a desired moment. While the trigger mechanism 320, shown in FIG. 13, is in wired communication with the communication device 102, it is understood that the trigger mechanism 320 can be in wireless communication with the communication device 102 in order to extend a distance between the user and the communication device 102.

In certain embodiments, the apparatus 300 may also include electrical components and wiring (not shown) to permit the apparatus 300 to be directly connected to a remote power source which provides the communication device 102 and the light source 306 with electricity. As a result, the user would no longer be required to separately connect each of the communication device 102 and the light source 306 to the remote power source. The apparatus 300 may also include an auxiliary power source (not shown) such as a rechargeable battery, for example, to provide electricity for the communication device 102 and the light source 306 when a connection to the remote power source is unavailable or undesired.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A system of capturing and sharing media, comprising:
   a plurality of communication devices;
   a management server in communication with the communication devices and including a processor and a downloadable user interface configured to distribute to the communication devices a media captured during a defined event, the media distributable to each communication device associated with the defined event, the user interface configured to distribute to at least one communication device a coded indicia, the coded indicia distributable to the at least one communication device associated with an administrator of the defined event, wherein the user interface includes a main screen appearing upon launching of the user interface, the main screen having:
   a join event action control, the join event action control launching a join event screen including a code entry box for inputting the coded indicia and a join event screen action control launching a view event screen, the view event screen including an event gallery containing the media associated with the defined event;
   a create event action control, the create event action control launching a create event screen, the create event screen including an entry box for inputting a selectable description of the defined event and a create event receipt screen action control launching an event receipt screen displaying the coded indicia; and
   a view event action control, the view event action control launching a list of events screen displaying the selectable description of the defined event, the selectable description launching the view event screen including the event gallery containing the media associated with the defined event, the media selectable to display an action sheet action control configured to selectively save the media from the event gallery to a memory of the communication devices, delete the media from the event gallery, edit the media, upload an edited one of the media to the event gallery, and return to the event gallery; and a database in communication with the management server configured to store data related to a plurality of registered user accounts.

2. The system according to claim 1, wherein at least one of the communication devices includes a sensor for reading data from the coded indicia.

3. The system according to claim 1, wherein at least one of the communication devices includes a camera for capturing the media.

4. The system according to claim 1, wherein the media includes a source identification.

5. The system according to claim 1, wherein each of the registered user accounts includes a user identifier and a visual identifier.

6. The system according to claim 1, further comprising at least one of a wireless telecommunication network and a wired telecommunication network in communication with the communication devices and the management server.

7. The system according to claim 1, wherein the defined event is at least one of an active event, an upcoming event, and a past event.

8. The system according to claim 1, further comprising at least one social network in communication with the communication devices, the media distributable to the at least one social network.

9. The system according to claim 1, wherein at least one of the communication devices is moveably coupled to an apparatus configured for use with a backdrop in a photography booth.

10. The system according to claim 9, wherein the apparatus includes a trigger mechanism in at least one of wired communication and wireless communication with the at least one communication device.

11. A method of capturing and sharing media, comprising the steps of:

providing a plurality of communication devices, wherein a first one of the communication devices and a second one of the communication devices are configured to capture media at a defined event, wherein the first one of the communication devices is a tablet and the second one of the communication devices is a smartphone;

providing a management server including a downloadable user interface in communication with the communication devices, the user interface including a main screen appearing upon launching of the downloadable user interface;

selecting a view event action control, a join event action control, or a create event action control included on the main screen, wherein upon selecting the join event action control a join event screen is launched through the user interface, the join event screen including a code entry box configured for inputting coded indicia and a separate action control spaced apart from the code entry box for viewing an event gallery;

creating the event gallery to contain the media for the defined event using the downloadable user interface after selecting of the create event action control;

obtaining the coded indicia through the user interface;

sharing the coded indicia with a plurality of recipients of the coded indicia;

subscribing to the event gallery by entering the coded indicia into the code entry box after selecting of the join event action control;

capturing the media at the defined event using the first one of the communication devices and the second one of the communication devices;

distributing the captured media wirelessly to the event gallery of the communication devices using the user interface during the defined event;

viewing the event gallery after selecting the view event action control;

selecting the media from the event gallery to selectively save the media from the event gallery to a memory of at least one of the communication device, delete the media from the event gallery, edit the media, upload an edited one of the media to the event gallery, and return to the event gallery; and providing an apparatus at the defined event for coupling the first one of the communication devices thereto, the apparatus including an elongate member and a trigger mechanism for actuating a camera of the first one of the communication devices, the camera capturing at least one of the media, wherein the apparatus is provided at the defined event.

12. The method according to claim 11, further comprising the steps of:

creating a registered user account by inputting at least one user identifier associated with a user into the user interface;

analyzing, by a processor of the management server, the captured media to detect a source identification of the captured media; and matching the source identification of the captured media to the registered user account.

13. The method according to claim 11, further comprising the step of:

selecting the event gallery from a list of defined events through the user interface.

14. The method according to claim 11, further comprising the steps of:

determining a duration of time to allow distribution of the captured media through the user interface; and choosing, if the duration of time has ended, at least one of ending the distribution of the captured media through the user interface, extending the duration of time to allow distribution of the captured media through the user interface, and allowing the distribution of the captured media through the user interface.

15. The method according to claim 11, further comprising the step of transacting a payment through the user interface after selecting the create event action control.

* * * * *